United States Patent [19]

Vaill

[11] 4,126,344
[45] Nov. 21, 1978

[54] COMPRESSIVE BUMPER ASSEMBLY

[75] Inventor: Ronald E. Vaill, Irwin, Pa.

[73] Assignee: Westinghouse Electric Corp., Pittsburgh, Pa.

[21] Appl. No.: 672,896

[22] Filed: Apr. 2, 1976

[51] Int. Cl.² ............................................. B60R 19/06
[52] U.S. Cl. ......................................... 293/4; 180/96; 200/61.58 R; 200/153 L; 293/89
[58] Field of Search ................. 180/96, 94, 92, 91, 180/103 A; 293/4, 89; 200/153 L, 153 LA, 153 LB, 61.58 R

[56] References Cited

U.S. PATENT DOCUMENTS

| | | | |
|---|---|---|---|
| 1,658,574 | 2/1928 | Schauman | 180/96 |
| 1,686,536 | 10/1928 | Schauman | 293/4 |
| 1,751,186 | 3/1930 | Adam | 180/96 |
| 2,584,078 | 1/1952 | Hsi-Yu | 180/96 X |
| 2,920,713 | 1/1960 | Paradise | 180/94 |
| 3,295,880 | 1/1967 | Klosterman | 293/89 X |
| 3,676,625 | 7/1972 | Blatt | 200/153 LA |
| 3,834,483 | 9/1974 | Palmer | 180/91 |
| 3,906,178 | 9/1975 | Fiddler | 200/153 LA |
| 3,980,852 | 9/1976 | Redfield | 200/153 LB |

*Primary Examiner*—John P. Silverstrim
*Attorney, Agent, or Firm*—J. J. Wood

[57] ABSTRACT

A compressive bumper assembly is disclosed for an electrically powered vehicle in which a bumper is resiliently supported in spaced relationship from the vehicle proper by means of a plurality of springs. The maximum displacement of the bumper from the vehicle is defined by means of inextensible members such as cables, chains or the like, which are secured to the bumper and to the vehicle. Levers are attached to the bumper at one end, the other ends having cam surfaces and being pivotally supported on the vehicle. Switches, electrically in series with the power supply for the vehicle, are provided with followers which are placed contiguously with the cam surfaces on the levers. The position of each follower determines the closed or open position of the associated switch. When the bumper comes in contact with personnel or any object, the bumper is compressed and the follower disciplined by the cam surface is displaced to open the proximate switch.

2 Claims, 4 Drawing Figures

COMPRESSIVE BUMPER ASSEMBLY

CROSS-REFERENCE TO RELATED APPLICATIONS

See copending application entitled "Guidance Control System for a Traction Vehicle", Ser. No. 642,805, filed on Dec. 22, 1975, in the name of Ricardo A. Diaz; copending application entitled "Automatic Data Processing and Control System", Ser. No. 642,806, filed on Dec. 22, 1975, in the names of F. T. Thompson, Ricardo A. Diaz and Theodore M. Heinrich; copending application entitled "Self Monitoring and Sequencing System for a Traction Vehicle", Ser. No. 642,804, filed on Dec. 22, 1975, in the names of Gary E. Baumgart and Ricardo A. Diaz; copending application entitled "Supervisory Control System", Ser. No. 642,803, filed on Dec. 22, 1975, in the names of Ricardo A. Diaz and Gary E. Baumgart; and copending application entitled "Powered Loading System", Ser. No. 666,811, filed on Mar. 15, 1976, in the names of George N. Kovatch, Ronald E. Vaill and William E. Kepes, all assigned to the same assignee as the present invention.

BACKGROUND OF THE INVENTION

Field of the Invention

This invention relates to a compressive bumper assembly for an electrically powered transport vehicle.

DESCRIPTION OF THE PRIOR ART

Compressive bumpers per se are well-known in the art. The present invention was conceived in an environment where the primary objective is to protect personnel against fortuitous contact with moving transport vehicles of the type described in the patent applications cited supra. In most prior art arrangements a person in collision with such a vehicle does experience a force which, even if not fatal or injurious, is nevertheless unwelcomed and unpleasant. The present invention, using a combination of known elements, provides a novel collision bumper which initiates emergency stopper upon the slightest contact between personnel and vehicle.

SUMMARY OF THE INVENTION

A compressive bumper assembly for an electrically powered vehicle is claimed in which a bumper means is provided. Tensile means are interposed between the bumper means and the vehicle forcing them apart. Inextensible means are connected between the bumper means and the vehicle to limit the maximum displacement of the bumper means from the vehicle. The inextensible means are collapsible upon slight compressive force applied to the bumper means. At one end thereof, lever means are attached to the bumper means; the other end of the lever means has a cam surface. Switching means, connected in series with the electrical power supply for the vehicle, comprises follower means, the displacement of the latter determining the closed and open positions for the switching means. The follower means is arranged contiguous with the cam surface, whereupon when the bumper means is compressed, the follower means, riding on the cam surface, is displaced to thereby place the switching means in open position.

DESCRIPTION OF A PREFERRED EMBODIMENT

Figure 1:
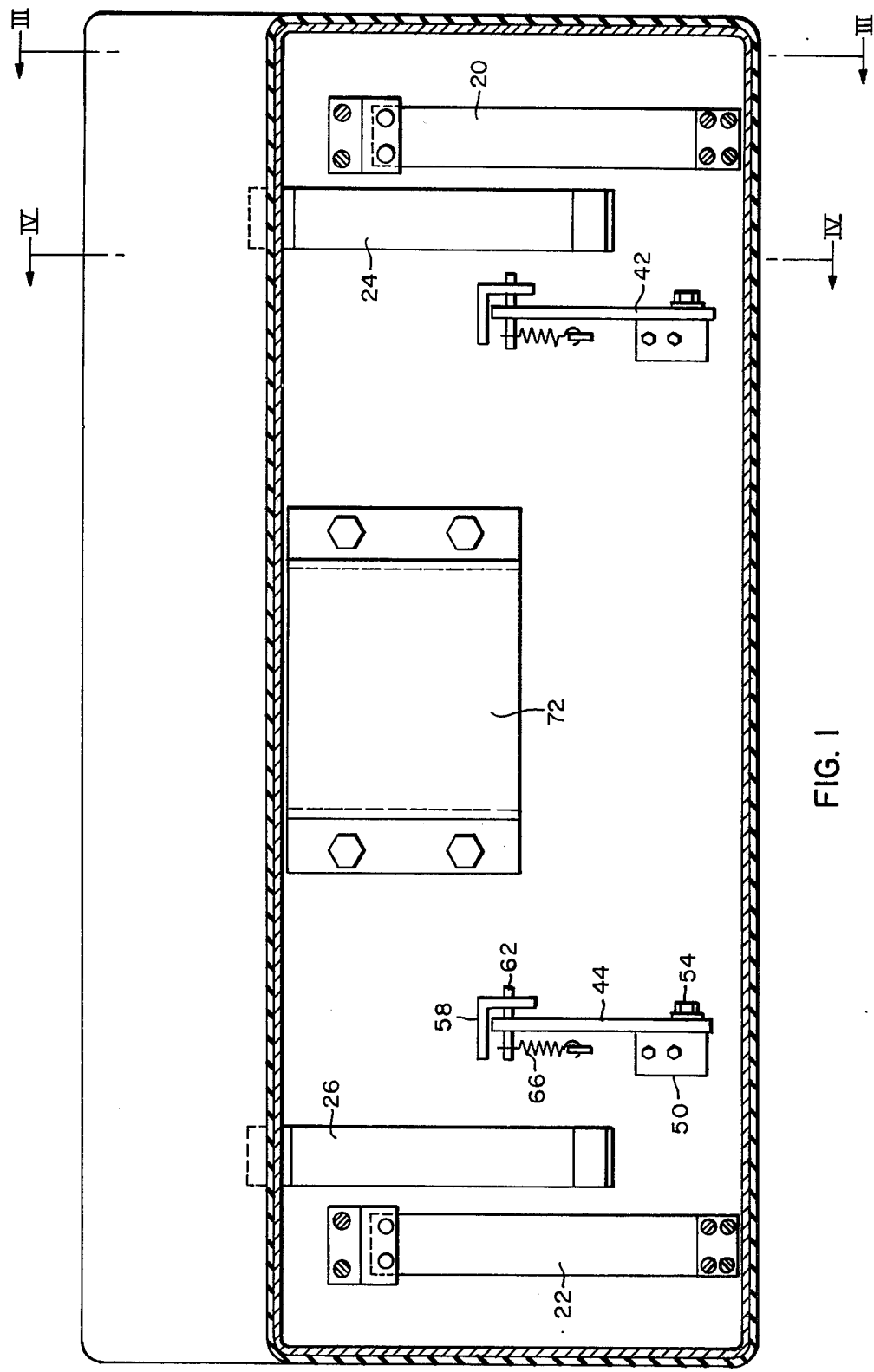
FIG. 1 is a front elevational view of the compressive bumper assembly in accordance with the invention.
Figure 2:
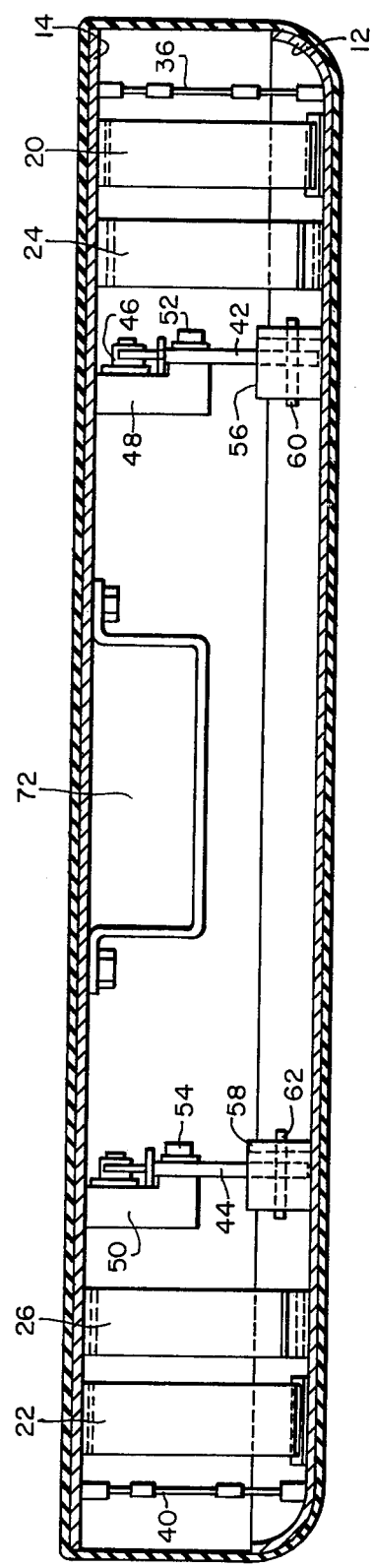
FIG. 2 is a top sectional view taken along the lines 2—2 of FIG. 1.

The compressive bumper assembly of the present invention is intended to protect personnel against accidental contact with an electric transport vehicle of the type described and claimed in the copending applications cited supra.

Referring now to FIGS. 1 to 4, the compressive bumper assembly is indicated generally at 10. A flat plate or bumper 12 extends the entire width of the transport vehicle, and is of sufficient height to insure physical contact by personnel. Stated differently, if a person is accidentally in the path of the moving vehicle, the height of plate 12 is sufficient to insure physical contact with the bumper 12 rather than with the vehicle proper. The plate 12 is turned up at the bottom and top and has a large radius corner at all edges.

The bumper assembly 10 is supported on a back plate 14 which itself is mounted on the vehicle in any convenient manner such as bolts, two of which are identified at 16, 18. The flat plate 12 is held at a fixed distance from the back plate 14. Four cantilever or leaf springs are identified at 20, 22 and 24, 26. The members 20, 22 are support springs and members 24, 26 are sliding springs. Each of the springs is secured to the back plate 14 by means of four screws and a pad. (FIG. 3 a pad, unnumbered, and two of the screws 28 and 30 may be seen for the sliding spring 24.)

Figure 3:
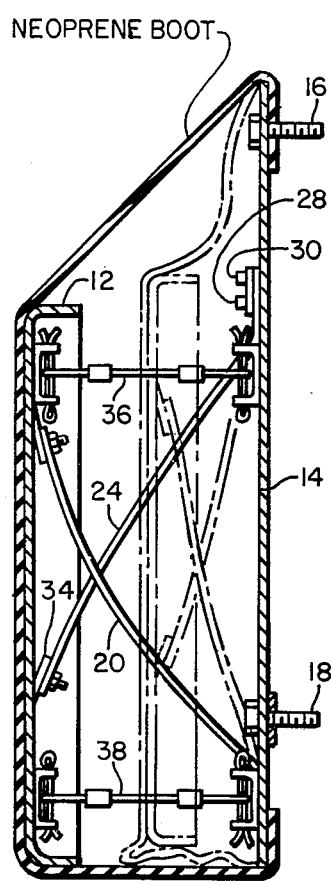
FIG. 3 is a sectional view taken along the lines 3—3 of FIG. 1.

The support springs 20, 22 are hinged to the flat plate 12; as shown in FIG. 3, for example, support spring 20 is hinged at 32. The sliding springs 24, 26 at the unsecured ends include a rubbing block which makes resilient, sliding contact with the bumper 12. For example, the sliding spring 24 has a rubbing block identified at 34.

Four inextensible members, only three of which may be seen in the drawings at 36, 38 and 40, define the maximum permissible displacement of the bumper 12 from the back plate 14 — about 4 inches. In the illustrative embodiment here depicted, members 36, 38 and 40 are cables, but a wire chain may also be utilized, the objective being to hold the bumper 12 at a maximum distance from the back plate 14, but be readily collapsible under compressive loads.

Figure 4:
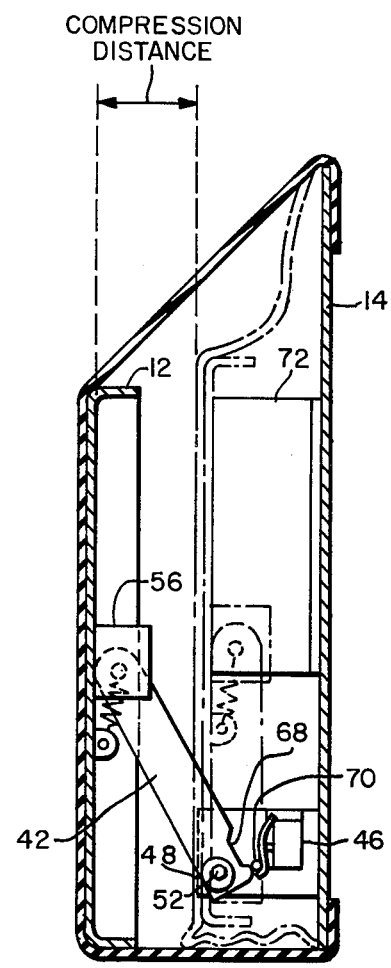
FIG. 4 is a sectional view taken along the lines 4—4 of FIG. 1.

The compressive bumper assembly 10 also includes two backstop levers 42, 44, one on each side of the bumper, each cooperating with a microswitch, only one of which will be identified and described (FIG. 4:46). Each backstop lever 42, 44 has a compression block 48, 50 which is secured to the back plate 14. The backstop levers 42, 44 are rotatably secured to the compression stopblocks 48, 50 by screws 52, 54. Brackets 56, 58 are secured to the flat plate 12 in any convenient manner. The backstop levers 42, 44 are mounted at one end to brackets 56, 58 by means of pivots 60, 62, respectively, which are biased by springs 64, 66 secured at one end to the flat plate 12. The back levers 42, 44 include machined cam surfaces; the cam surface for back lever 42 is identified at Figure 4:68. These cam surfaces coact with pin followers on the microswitches. In FIG. 4 the pin follower for the microswitch 46 is identified at 70. The microswitches are normally closed and are electrically in series with the main power supply for the vehicle as described in the copending application entitled "Self Monitoring and Sequencing System for a Traction Vehicle", Ser. No. 642,804, filed on Dec. 22, 1975, in the names of Gary E. Baumgart and Ricardo A. Diaz. A housing for the handle (not shown) used for manual operation of the vehicle is identified at 72. The entire compressive bumper assembly is covered with a neoprene boot (unnumbered).

In operation, if the transport vehicle comes in contact with a person or an object, the flat plate 12 is pushed inwardly causing either microswitch or both to be electrically open. Since the microswitches are in series, the opening of either one will cause the vehicle to be deenergized and emergency braking initiated as described in the copending application to Gary E. Baumgart and Ricardo A. Diaz (for a "Self Monitoring and Sequencing System for a Traction Vehicle" cited supra).

As shown in phantom outline in FIGS. 3 and 4, this is accomplished by the flat plate 12 being displaced inwardly carrying with it the backstop levers. The pin follower 70 on switch 46 (and/or its counterpart on the other microswitch) rides along the cam surface 68 and causes the associated microswitch to open. As may be seen from a study of the phantom outline in FIGS. 3 and 4, the flat plate 12 moves inwardly and upwardly. The support blocks 48, 50 for the backstop levers 42, 44 define the extent of maximum displacement, as does also the housing block 72 for the handle. The vehicle (some 1500 lbs.) is quickly brought to a halt, and the only force experienced by the person is the force necessary to overcome the combined spring force and the slight resistance offered by the backstop levers against rotational displacement. The compression distance is approximately two inches (approximately 5 centimeters).

I claim:

1. A compressive bumper assembly for an electrically powered vehicle comprising:
   (a) bumper means for said vehicle;
   (b) tensile force means comprising four cantilever springs, one pair of said springs being rigidly secured at the ends between said bumper means and said vehicle, respectively, the other pair of springs respectively having one end connected to said bumper means, the other end being contiguous with said bumper means and free for sliding displacement thereon;
   (c) inextensible means connected between said bumper means and said vehicle to limit the maximum displacement of said bumper means from said vehicle, said inextensible means being collapsible under slightly compressive forces on said bumper means;
   (d) lever means, connected to said bumper means at one end, and having a cam surface at the other end, said lever means yieldingly collapsing under compressive substantially vertical forces;
   (e) switching means connected in series with the electric power source for said vehicle, comprising follower means, the displacement of said follower means defining the closed and open positions of said switching means, said follower means being contiguous with said cam surface, whereby when said bumper means is compressed, said follower means is displaced by said cam surface to said open position of said switching means.

2. A compressive bumper assembly for an electrically powered vehicle comprising:
   (a) bumper means for said vehicle;
   (b) means for providing a tensile force interposed between said bumper means and said vehicle;
   (c) inextensible means connected between said bumper means and said vehicle to limit the maximum displacement of said bumper means from said vehicle, said inextensible means being collapsible under slightly compressive forces on said bumper means;
   (d) a lever rod member pivotally secured at one end to said bumper means and having a cam surface at the other end, said cam surface end being rotatably supported on a compression stopblock secured to said vehicle;
   (e) switching means connected in series with the electric power source for said vehicle, comprising follower means, the displacement of said follower means defining the closed and open positions of said switching means, said follower means being contiguous with said cam surface, whereby when said bumper means is compressed, said follower means is displaced by said cam surface to said open position of said switching means.

* * * * *